March 14, 1933. C. SCHLOTTERHOSE 1,901,264
METHOD OF PRODUCING ANIMAL FOOD
Original Filed Jan. 30, 1931
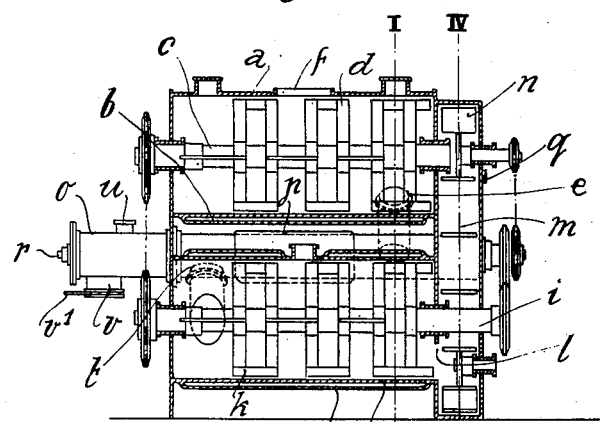
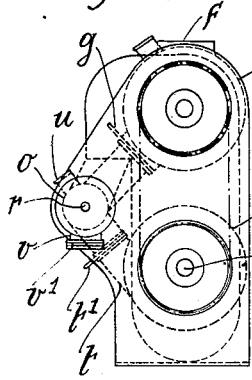
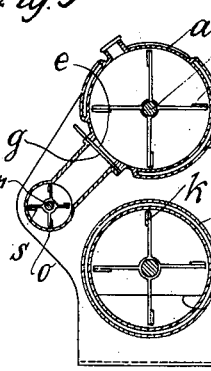
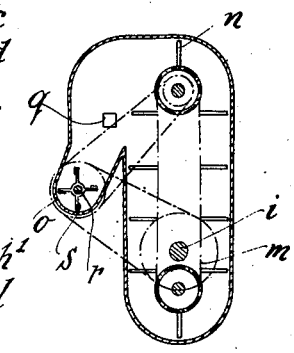
Inventor:
Conrad Schlotterhose Patented Mar. 14, 1933

1,901,264

UNITED STATES PATENT OFFICE

CONRAD SCHLOTTERHOSE, OF WESERMUNDE-WULSDORF, GERMANY

METHOD OF PRODUCING ANIMAL FOOD

Original application filed January 30, 1931, Serial No. 512,426, and in Germany November 26, 1930. Divided and this application filed February 20, 1932. Serial No. 594,353.

This invention relates to the method of producing animal foods from protein substances containing water, especially from fish having a low percentage of fat and other material containing glue, the subject matter of which is divided out of my application for patent in the United States filed January 30, 1931 and numbered 512,426.

In the existing fish and slaughterhouse refuse utilization plants, no particular difficulties exist in the treatment of material containing fat, both in continuous and also in intermittent working. For intermittent so-called working in charges, ordinary horizontal apparatus are sufficient with double heating jacket and built-in stirring mechanism which thoroughly works the material and thus enables a uniform drying. Rotary drying drums provided with steam jacket may also be employed for this purpose.

However, the working of lean material, that is, in which not more than 2 to 3% of oil is contained in the dry product, presents the difficulty that as soon as a certain percentage of moisture is removed, the glue producing fibres adhere to the heating walls and impede or entirely prevent further drying. Consequently, the time of treating a charge is considerably prolonged and in many instances the drying must even be interrupted in order to clean the heating surfaces. Moreover, it has been positively ascertained that the adhering portions are charred or burned, so that the quality of the resultant finished product (meat or fish flour) is detrimentally affected. It has been endeavoured to overcome this objection by drawing off the glue liquor after sterilization, the remaining material which has no longer any tendency to cake being then dried without trouble. This method is, however, open to the objection that by drawing off the glue liquor, important nutritive substances (nitrogen compounds) are lost, so that the quality of the finished product is considerably lowered.

All these objections are obviated by the invention which consists in that the adhesive property of the glue, which causes the caking on the heating surfaces, is neutralized by a single or repeated cooling of the material between the heating periods, if necessary under vacuum or with the admission of air during the individual working periods.

Owing to the sudden cooling of the sterilized material, as soon as its moisture has sunk to a certain degree, it loses its adhesive property. The subsequent final drying to the desired degree of moisture can easily be effected without any danger that the material will cake on the heating surfaces.

While different means may be provided for carrying the method into practice, the accompanying drawing forming part of this application discloses an apparatus by which the method has been successfully practiced.

In this drawing,—

Figure 1 shows the apparatus in longitudinal section;

Figure 2 is a side elevation of Fig. 1;

Figure 3 is a section on line I—I of Fig. 1; and

Fig. 4 is a section on line IV—IV of Fig. 1.

A horizontal completely closed drum $a$ with heating jacket $b$ serves for sterilizing the material, and a connection for direct steam supply may also be provided especially for the sterilization of slaughterhouse refuse. This sterilization is carried out at a more or less high temperature, according to the material to be treated, fish waste or slaughterhouse refuse. A stirring mechanism $d$ mounted on a shaft $c$ is built into the drum $a$, and effects a thorough working of the material, thus enabling a uniform sterilization, this stirring mechanism also conveying the material to a discharge aperture $e$. The raw material is charged through an easily closable aperture $f$ and after sterilization passes out into a drum $h$ situated thereunder, through the discharge aperture $e$, which can be closed by a shutter $g$. The transition from the upper drum $a$ to the lower drum $h$ may be either direct or, as shown in the drawing, with interposition of a drum $o$ herinafter described, provided with conveying mechanism and serving chiefly for cooling. The drum $h$ also has a heating jacket $h_1$ and a stirring mechanism $k$ mounted on a shaft $i$, said mechanism thoroughly working the material and conveying it to the discharge aperture $l$. The material passes through the aperture $l$ into a laterally arranged elevator, the buckets $n$ of which convey the material to a separate apparatus, for example, the drum $o$. This drum $o$ also has a jacket $p$ which is arranged so that the material contained in the apparatus may be cooled by introducing cooling water into the jacket $p$. At the same time, air can be supplied in any suitable manner through a vent $q$ adjustable by a shutter or the like.

As soon as the glue is bound in the material, this drum $o$ may also be employed for drying by admitting steam into its jacket $p$.

A separate stirring mechanism $s$ is mounted on a shaft $r$ of the drum $o$ and removes the material from the elevator $m$. The material can also be returned to the drum $h$ from the drum $o$ through a suitable chute $t$ also adapted to be closed by a shutter $t_1$.

In this manner, it is possible to obtain a circulation of the material within the drum $h$ and the drum $o$, the material being alternately heated and cooled. After the binding of the glue, the drying takes place in both drums, the vapors produced being sucked off through discharge pipes $u$ by means of an exhauster or a vacuum pump. However, at the same time the drum $o$ above the lower drum $h$ is extended so that the finished material is supplied to a discharge chute $v$ which can be closed by a shutter $v_1$ and, on the chute $v$ being opened, the material can be sacked at this point, the chute $t$ being closed by the shutter $t_1$. As the emptying is effected through the drum $o$, the finished material can at the same time be cooled by supplying cooling water into the jacket $p$, so that it is directly ready for sacking, and a separate cooling in the air is therefore not necessary. This is very desirable in the interests of good quality and durability of the finished material.

I claim:

1. A method for producing animal foods from protein substances containing water, especially from fish having a low percentage of fat and other material containing glue, consisting in heating the material and in removing the adhesive property of the glue causing the caking on the heating surfaces by repeated cooling of the material during the heating periods.

2. A method as specified in claim 1, consisting in effecting a subsequent drying in a single operation after the cooling and heating.

3. A method as specified in claim 1, consisting in effecting the different working stages successively so that the heating and cooling is carried out in a continuous operation.

CONRAD SCHLOTTERHOSE.